(12) United States Patent
Iwamoto et al.

(10) Patent No.: US 6,916,364 B2
(45) Date of Patent: Jul. 12, 2005

(54) INK JET RECORDING LIQUID

(75) Inventors: Kyoko Iwamoto, Hino (JP); Satoru Ikesu, Hino (JP); Takatsugu Suzuki, Hino (JP)

(73) Assignee: Konica Corporation (JP)

( * ) Notice: Subject to any disclaimer, the term of this patent is extended or adjusted under 35 U.S.C. 154(b) by 113 days.

(21) Appl. No.: 10/437,660

(22) Filed: May 14, 2003

(65) Prior Publication Data

US 2003/0230216 A1 Dec. 18, 2003

(30) Foreign Application Priority Data

May 28, 2002 (JP) ........................................ 2002-153904

(51) Int. Cl.⁷ .............................................. C09D 11/02
(52) U.S. Cl. ................................. 106/31.47; 106/31.77
(58) Field of Search ............................ 106/31.47, 31.77

(56) References Cited

U.S. PATENT DOCUMENTS

| | | | | | |
|---|---|---|---|---|---|
| 1,980,549 | A | * | 11/1934 | Raeder ........................ | 544/245 |
| 2,068,989 | A | * | 1/1937 | Koeberle et al. ........... | 544/248 |
| 2,557,328 | A | * | 6/1951 | Wardleworth ................. | 8/636 |
| 2,778,831 | A | * | 1/1957 | Lodge et al. ................ | 544/248 |
| 2,962,497 | A | * | 11/1960 | Guenthard ................... | 544/188 |
| 4,001,170 | A | * | 1/1977 | Wick ........................... | 524/89 |
| 4,088,572 | A | * | 5/1978 | Cooper et al. ................ | 546/74 |
| 5,084,099 | A | | 1/1992 | Jaeger ..................... | 106/31.29 |
| 5,663,217 | A | | 9/1997 | Kruse ...................... | 106/31.37 |
| 2004/0106782 | A1 | * | 6/2004 | Iwamoto et al. ............ | 534/653 |

FOREIGN PATENT DOCUMENTS

| | | |
|---|---|---|
| EP | 0927747 | 7/1999 |
| EP | 1067155 | 1/2001 |
| EP | 1123932 | 8/2001 |
| JP | 231975 | 10/1991 |
| JP | 148436 | 6/1993 |
| JP | 186723 | 7/1993 |
| JP | 295312 | 11/1993 |
| JP | 508883 | 12/1993 |
| JP | 70490 | 3/1995 |
| JP | 82515 | 3/1995 |
| JP | 97541 | 4/1995 |
| JP | 118584 | 5/1995 |
| JP | 306221 | 11/1998 |

OTHER PUBLICATIONS

An Efficient Synthesis . . . 2'-Azadimethoxybenzanthrone Tim Sattelkau, et al 262–266 (2001), no month available.
Synthesis . . . Derivatives—J. Med. Chem., 44, 12, 2004–2014 Xianyoung Bu, et al.
European Search Report EP 03 25 3047, Aug. 2003.

* cited by examiner

*Primary Examiner*—Helene Klemanski
(74) *Attorney, Agent, or Firm*—Muserlian, Lucas and Mercanti

(57) ABSTRACT

An ink jet recording liquid including a compound represented by the following Formula (1), (2) or (3):

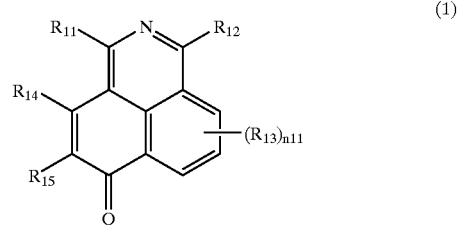

(1)

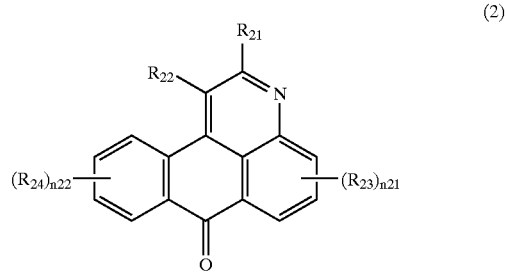

(2)

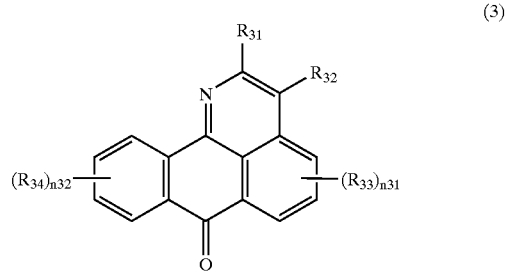

(3)

20 Claims, No Drawings

INK JET RECORDING LIQUID

BACKGROUND OF THE INVENTION

1. Field of the Invention

The present invention relates to an ink jet recording liquid containing a specific dye, in particular, it relates to an ink jet recording liquid excellent in color tone and fastness of a color image of ink.

2. Description of Related Art

An ink jet recording system is generally divided into a method such that droplet is ejected due to pressure by electrical-mechanical conversion of a Piezo element, a method such that droplet is ejected due to pressure by generating bubbles according to electrical-heat conversion, a method such that droplet is ejected by electrostatic force, and the like.

In an ink jet recording liquid (hereinafter referred to as ink for ink jet or simply as ink), it is required, for example, to be suitable for any recording system selected from above, to have high recording image density and also have favorable color tone, to be excellent in color image fastness such as light fastness, heat resistance and water proofing, to be speedy in terms of fixing on a recording medium and not to blur after recording, to be excellent in terms of storage stability as ink, to have no inherent safety problems such as toxicity and flammability, to be inexpensive and the like.

From the above-mentioned viewpoints, various kinds of ink jet recording liquids have been proposed and studied. However, an ink jet recording liquid which satisfies most of aforesaid requirements concurrently is extremely rare.

In color image recording employing yellow, magenta, cyan and black, for example, dyes and pigments having C.I. numbers, which are well known in earlier technology and described in the C.I. Index, have been studied extensively. For example, in magenta ink using water-soluble dyes, the ones using water-soluble dyes of xanthene types, such as C.I. Acid Red 52, and azo type, such as C.I. Direct Red 20, have been known. However, although these have high reliability to clogging in a printer, they have some problems in fastness such as light fastness and water proofing on the contrary. On the other hand, pigments of quinacridon types, such as C.I. Pigment Red 122, have been known. However, although these have high fastness, the printing density does not improve, or problems in color reproducibility, such as bronzing or the like, easily occur. Thus, with well-known dyes or pigments in the earlier technology, it is difficult to juggle color tone and fastness that are required for ink for ink jet.

In order to solve the above-mentioned problems, the Japanese Patent Laid-Open Publication No. 10-306221 discloses an anthrapyridone compound and its water-based ink composition aiming at juggling of color tone and light fastness. However, in this fast-evolving field, its level is not enough, and further improvement has been desired.

SUMMARY OF THE INVENTION

The present invention was made in view of the above-described problems. An object of the present invention is to provide an ink jet recording liquid, particularly an ink jet recording liquid for magenta, giving a color image with excellent light fastness and excellent color tone for favorable color reproduction.

Another object of the present invention is to provide a water-based ink jet recording liquid capable of being employed during a long term, giving a color image with excellent light fastness and excellent color tone.

The above-described objects will be achieved by the following composition.

That is, according to a first aspect of the present invention, the ink jet recording liquid of the present invention comprises a compound represented by the following Formula (1):

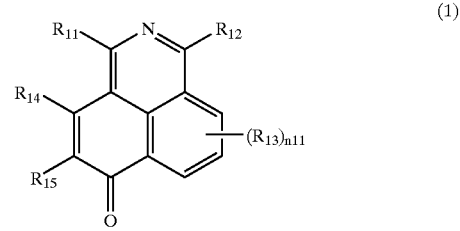

(1)

wherein each of $R_{11}$, $R_{12}$, $R_{13}$, $R_{14}$ and $R_{15}$ in the Formula (1) represents a hydrogen atom or a substituent, and n11 represents an integer number from 1 to 3.

Further, according to a second aspect of the present invention, the ink jet recording liquid of the present invention comprises a compound represented by the following Formula (2):

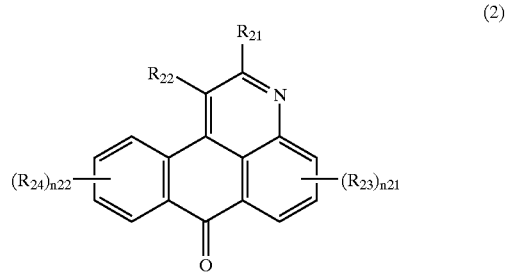

(2)

wherein each of $R_{21}$, $R_{22}$, $R_{23}$ and $R_{24}$ in the Formula (2) represents a hydrogen atom or a substituent, and n21 represents an integer number from 1 to 3 and n22 represents an integer number of 1 or 2.

Moreover, according to a third aspect of the present invention, the ink jet recording liquid of the present invention comprises a compound represented by the following Formula (3):

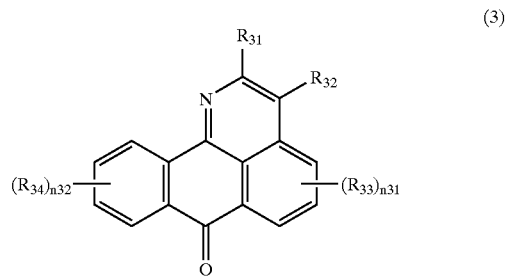

(3)

wherein each of $R_{31}$, $R_{32}$, $R_{33}$ and $R_{34}$ in the Formula (3) represents a hydrogen atom or a substituent, and n31 represents an integer number from 1 to 3 and n32 represents an integer number from 1 to 4.

In the ink recording liquid of the present invention, the compound represented by the Formula (1), (2) or (3) is preferable to comprise a sulfonate group or a carboxyl group.

Further, preferably, the compound represented by the Formula (1), (2) or (3) is contained as a fine particle dispersion material.

Furthermore, more preferably, the compound represented by the Formula (1), (2) or (3) is contained as a fine particle dispersion material with an oil-soluble polymer.

DETAILED DESCRIPTION OF THE INVENTION

Hereinafter, the present invention will be explained in detail.

The compound represented by the Formula (1), (2) or (3) of the present invention (hereinafter, also referred to as the dye of the present invention) will be explained.

First, the compound represented by Formula (1) of the present invention will be explained in detail.

In the above-described Formula (1), each of $R_{11}$, $R_{12}$, $R_{13}$, $R_{14}$ and $R_{15}$ represents a hydrogen atom or a substituent.

As for the substituent, it is not limited particularly, however, representatively, each group of alkyl, aryl, anilino, acylamino, sulfonamide, alkylthio, arylthio, alkenyl, cycloalkyl and the like is given. Moreover, in addition to these, a halogen atom and each group of cycloalkenyl, alkinyl, heterocyclic, sulfonyl, sulfinyl, phosphonyl, acyl, carbamoyl, sulfamoyl, cyano, alkoxy, aryloxy, heterocyclicoxy, siloxy, acyloxy, sulfonyloxy, carbamoyloxy, amino, alkylamino, imide, ureido, sulfamoylamino, alkoxycarbonylamino, aryloxycarbonylamino, alkoxycarbonyl, aryloxycarbonyl, heterocyclicthio, thioureido, carboxy, hydroxy, mercapto, nitro, sulfo and the like, and spiro compound residue, bridge-containing hydrocarbon compound residue and the like are also given. Further, $R_{14}$ and $R_{15}$ may be mutually bonded to form a ring.

As for $R_{14}$ and $R_{15}$, preferably, $R_{14}$ and $R_{15}$ are mutually bonded to form an aromatic ring. More preferably, $R_{14}$ and $R_{15}$ are mutually bonded to form substituted or non-substituted benzene ring.

In Formula (1), n11 represents an integer number from 1 to 3. When n11 is two or more, $R_{13}$s may be the same as or different from each other. Further, when n11 is two or more, two $R_{13}$s may be mutually bonded to form a ring.

Next, the compound represented by Formula (2) will be explained.

In the above-described Formula (2), each of $R_{21}$, $R_{22}$, $R_{23}$ and $R_{24}$ represents a hydrogen atom or a substituent. As examples of the substituent, the same substituents as $R_{11}$ to $R_{15}$ in Formula (1) can be given.

In Formula (2), n21 represents an integer number from 1 to 3, and n22 represents an integer number of 1 or 2. When n21 is two or more and n22 is two, $R_{23}$s and $R_{24}$s may be the same or different. Further, when n21 is two or more and n22 is two, two $R_{23}$s or $R_{24}$s may be mutually bonded to form a ring.

Next, the compound represented by Formula (3) will be explained.

In the above-described Formula (3), each of $R_{31}$, $R_{32}$, $R_{33}$ and $R_{34}$ represents a hydrogen atom or a substituent. As examples of the substituent, the same substituents as $R_{11}$ to $R_{15}$ in Formula (1) can be given.

In Formula (3), n31 represents an integer number from 1 to 3, and n32 represents an integer number from 1 to 4. When n31 and n32 are two or more, $R_{33}$s and $R_{34}$s may be the same or different. Further, when n31 and n32 are two or more, two $R_{33}$s or $R_{34}$s may be mutually bonded to form a ring.

Hereinafter, concrete examples of the dyes of the present invention will be explained. However, the present invention is not limited to these.

In addition, the character M in the following constitutional formulas represents a cation such as a sodium salt, a potassium salt, a ½ calcium salt, an ammonium salt or the like.

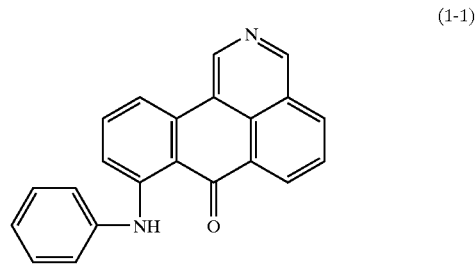

(1-1)

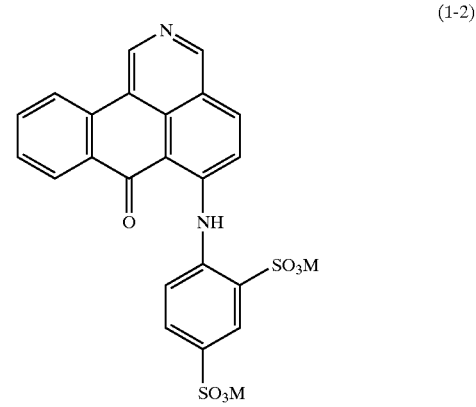

(1-2)

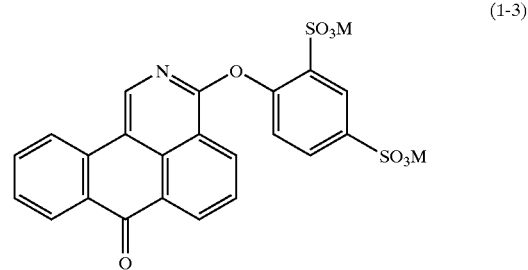

(1-3)

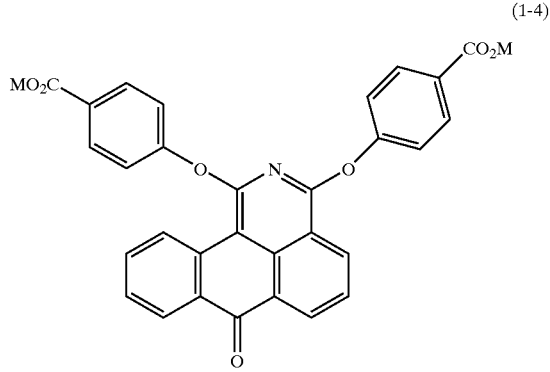

(1-4)

-continued
(1-5)
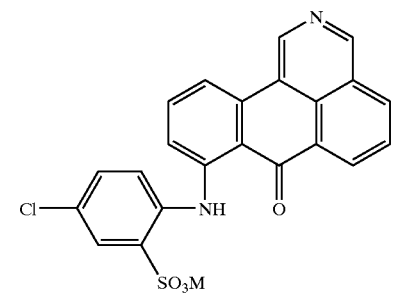
(1-6)
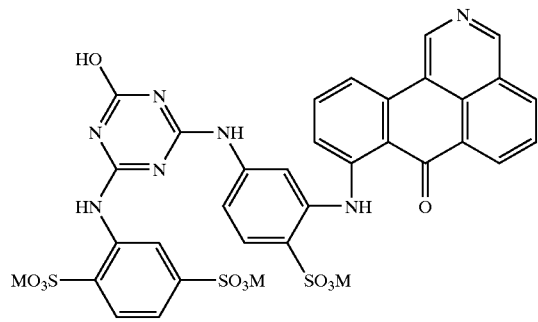
(1-7)
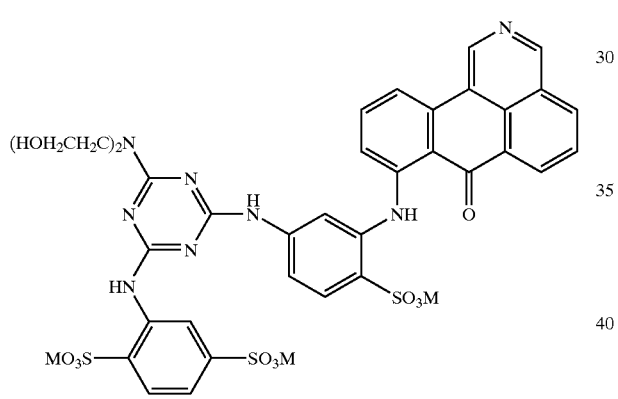
(1-8)
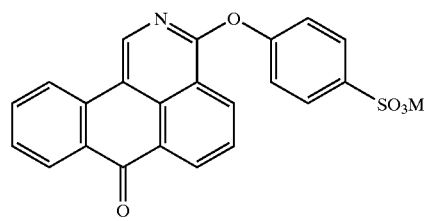
(1-9)
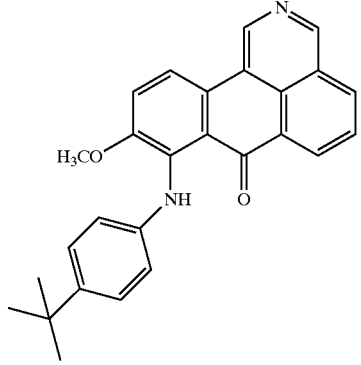
-continued
(1-10)
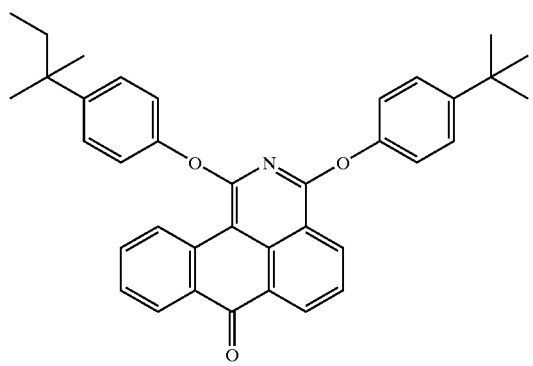
(1-11)
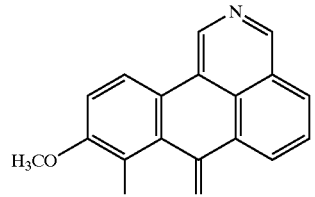
(1-12)
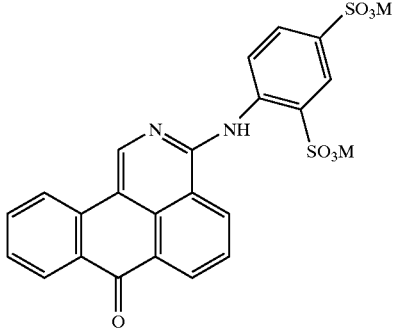
(1-13)
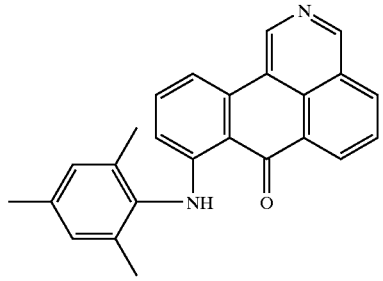
(1-14)
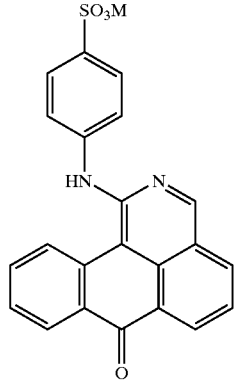

(1-15)
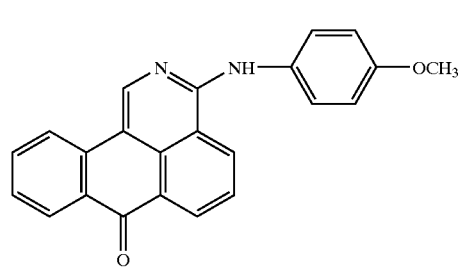
(1-16)
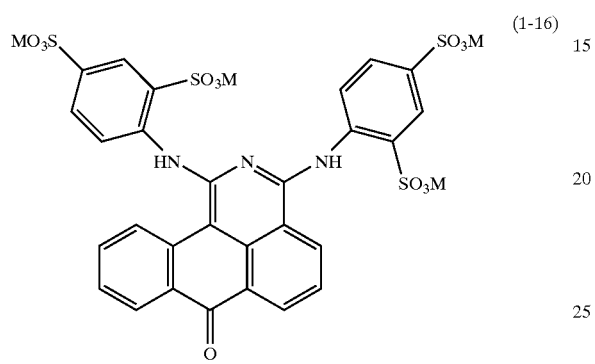
(1-17)
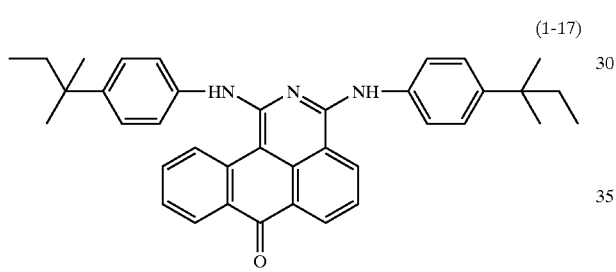
(1-18)
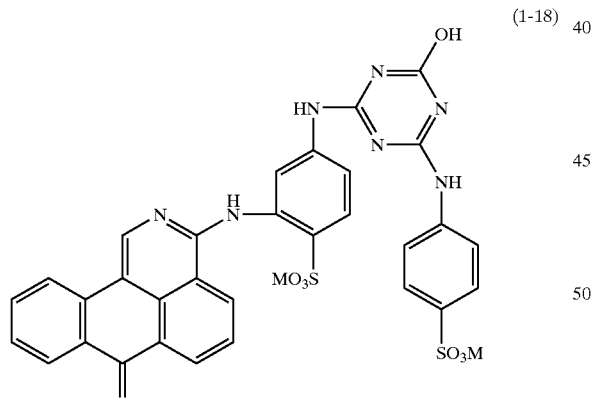
(1-19)
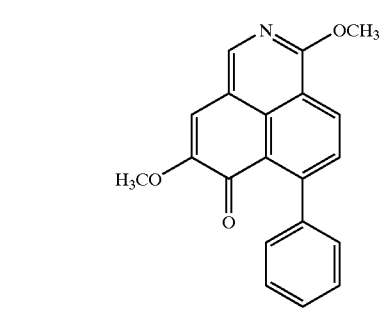
(1-20)
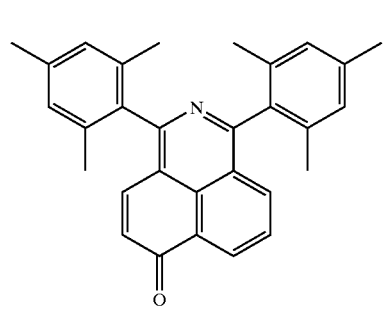
(1-21)
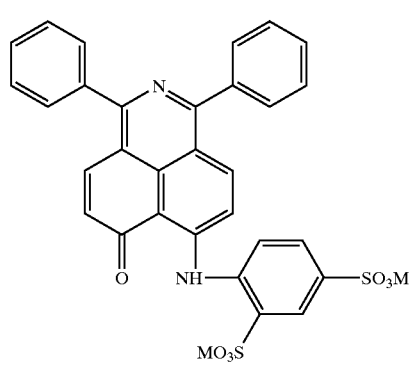
(1-22)
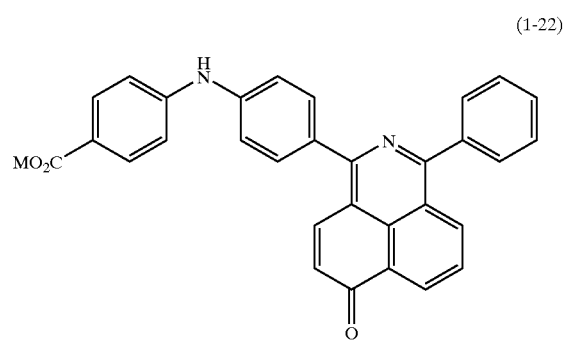
(1-23)
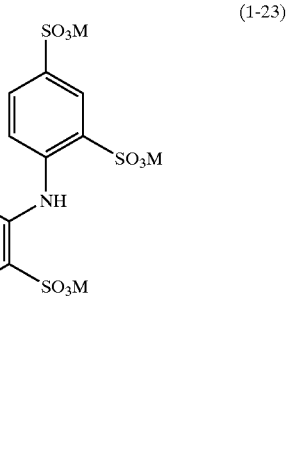

(1-24) 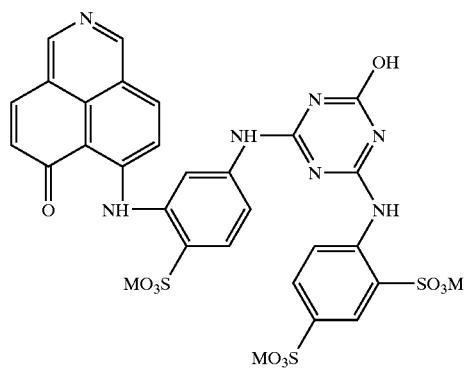
(1-25) 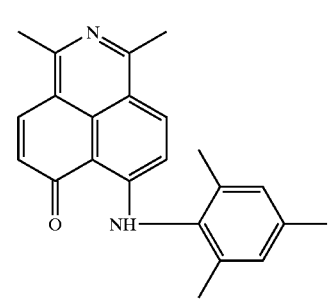
(1-26) 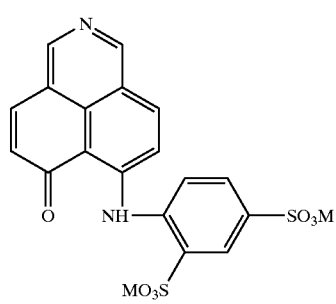
(1-27) 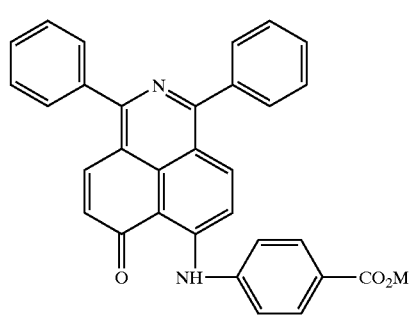
(2-1) 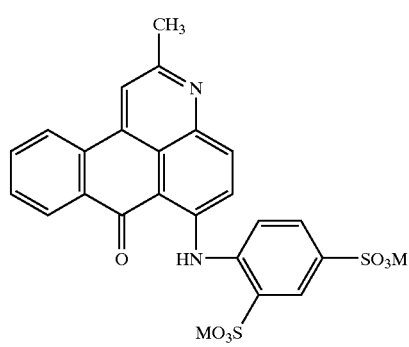
(2-2) 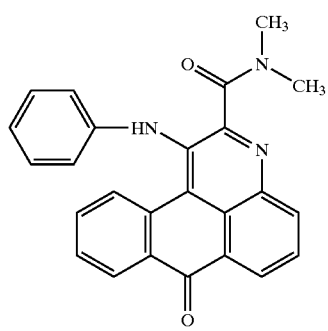
(2-3) 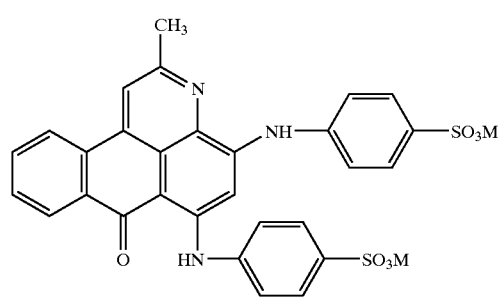
(2-4) 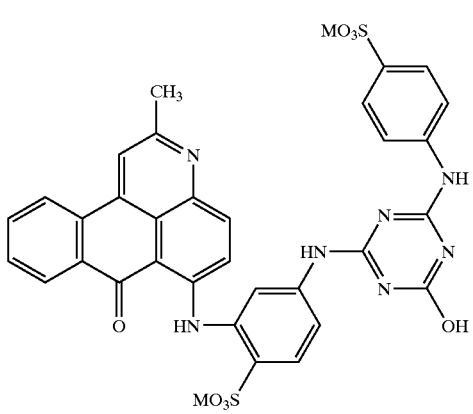
(2-5) 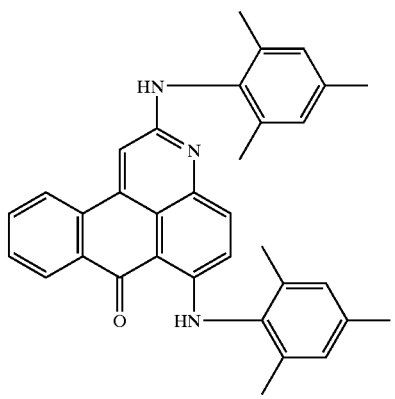

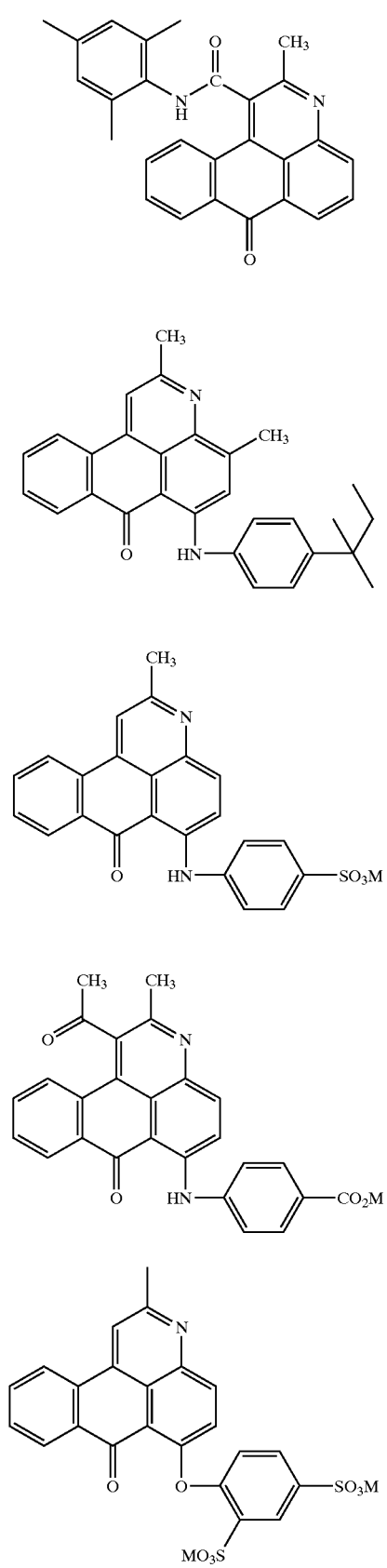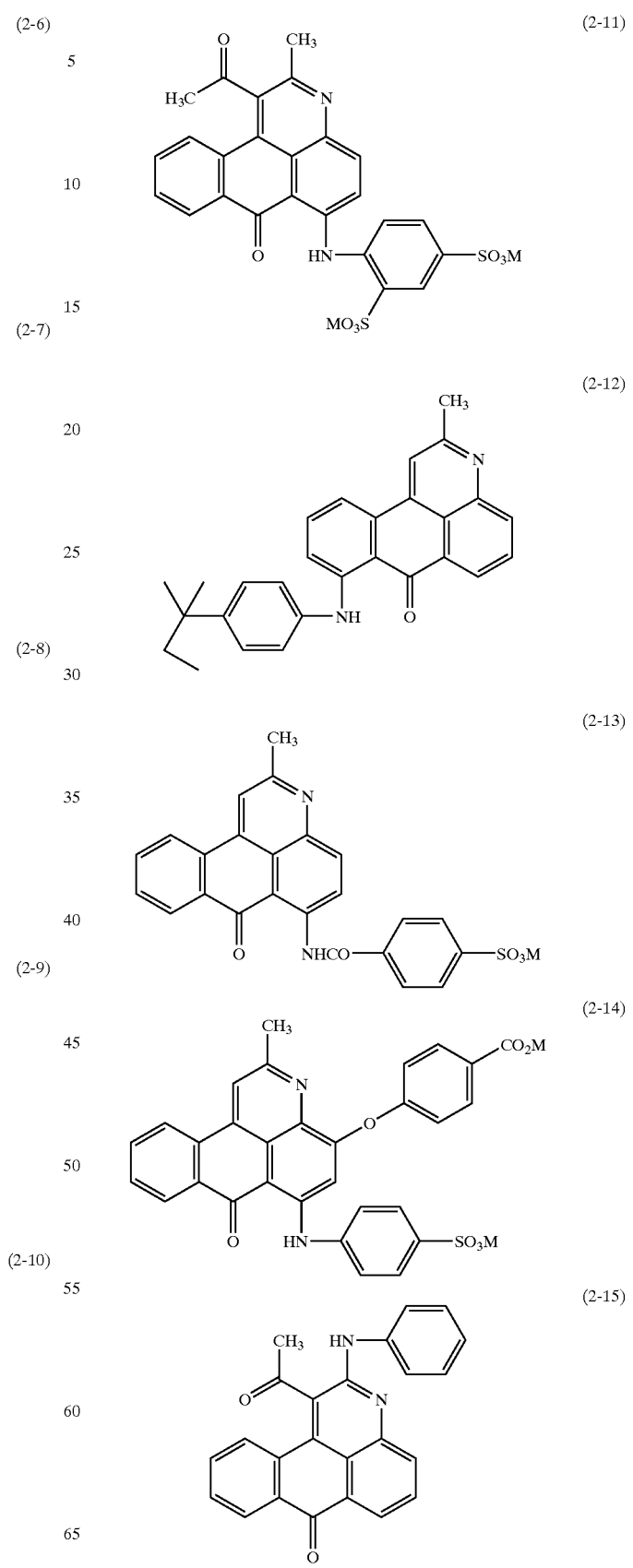

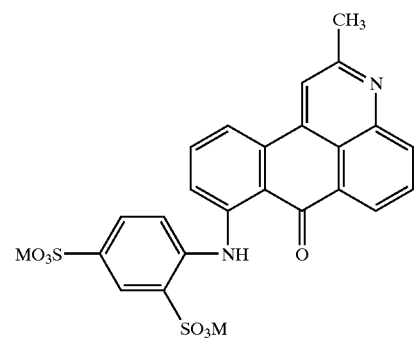
(2-16)
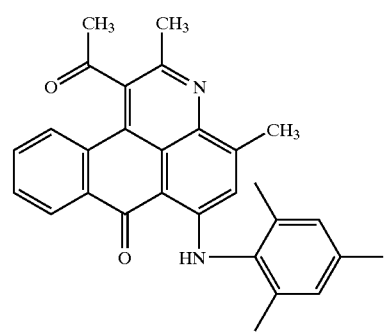
(2-17)
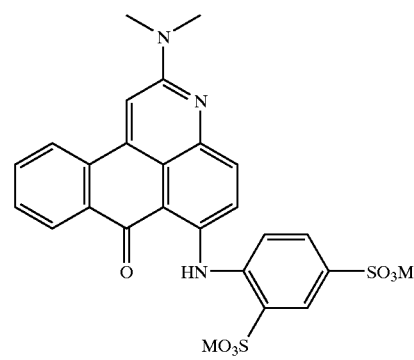
(2-18)
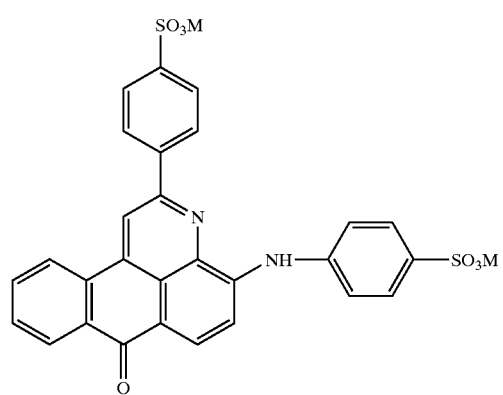
(2-19)
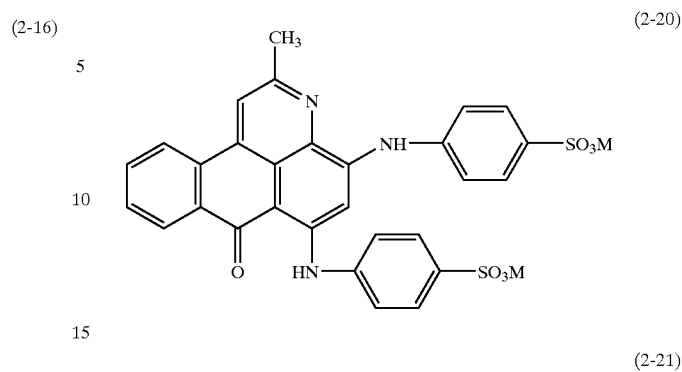
(2-20)
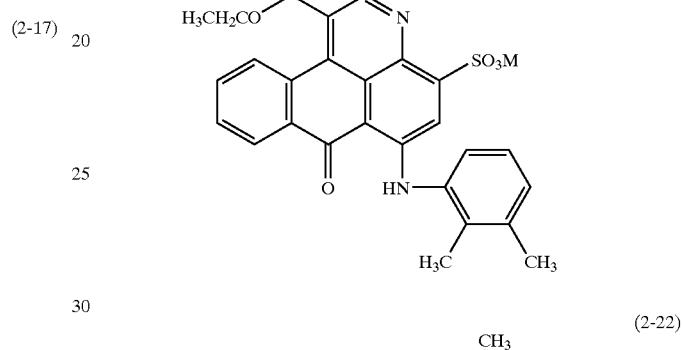
(2-21)
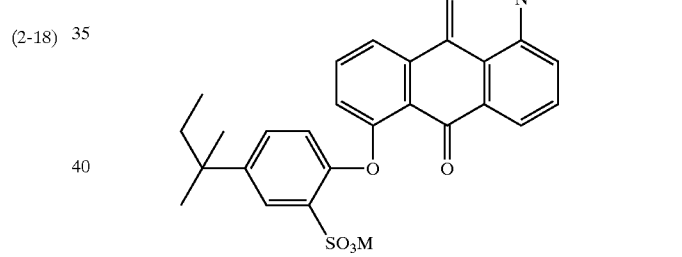
(2-22)
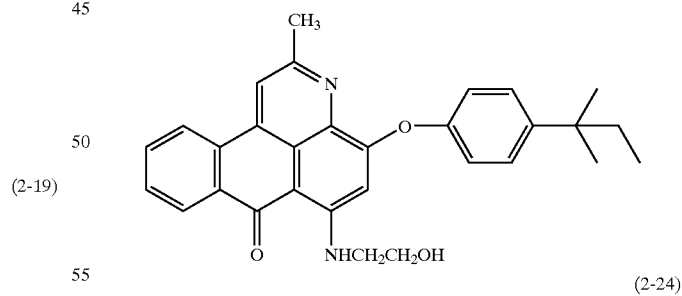
(2-23)
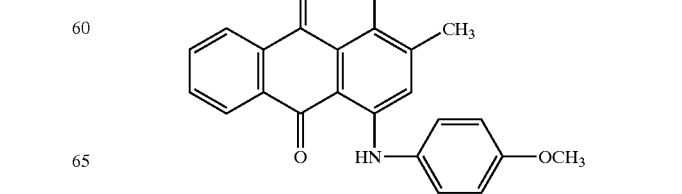
(2-24)

-continued
(2-25)
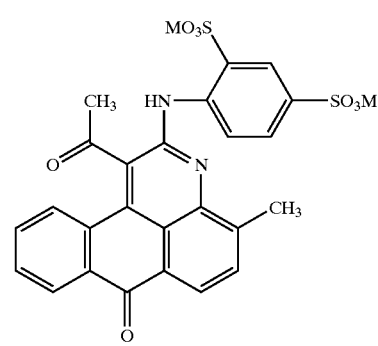
(2-29)
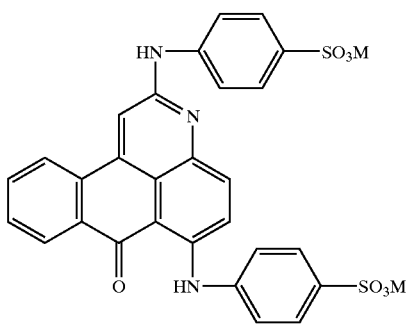
(2-26)
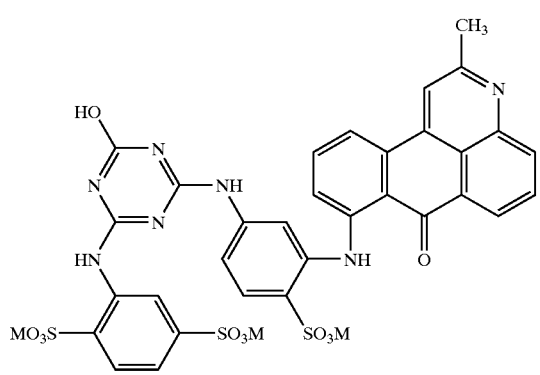
(3-1)
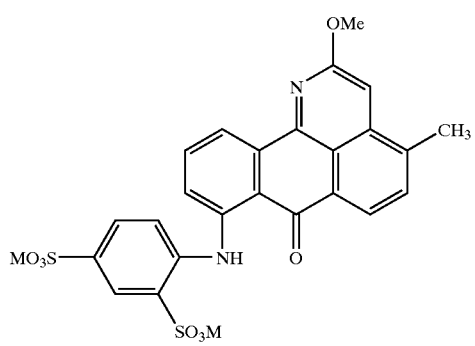
(2-27)
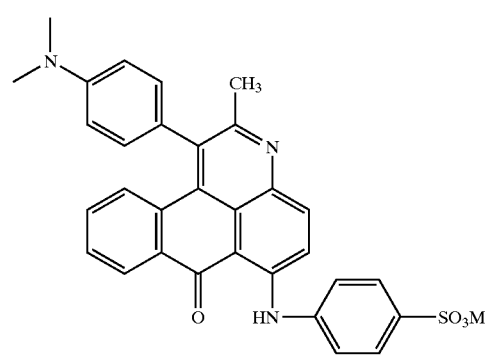
(3-2)
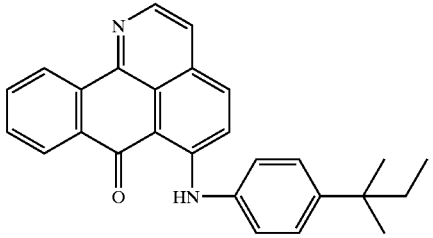
(3-3)
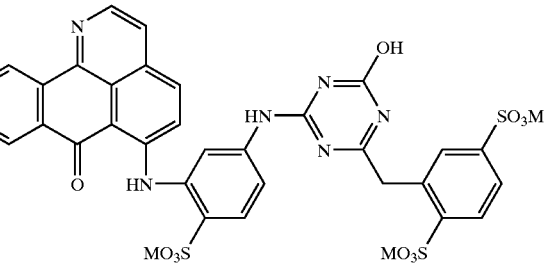
(2-28)
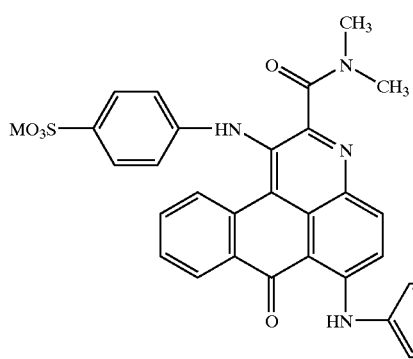
(3-4)
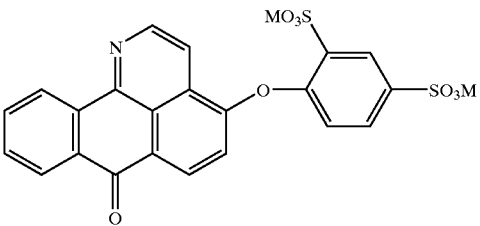

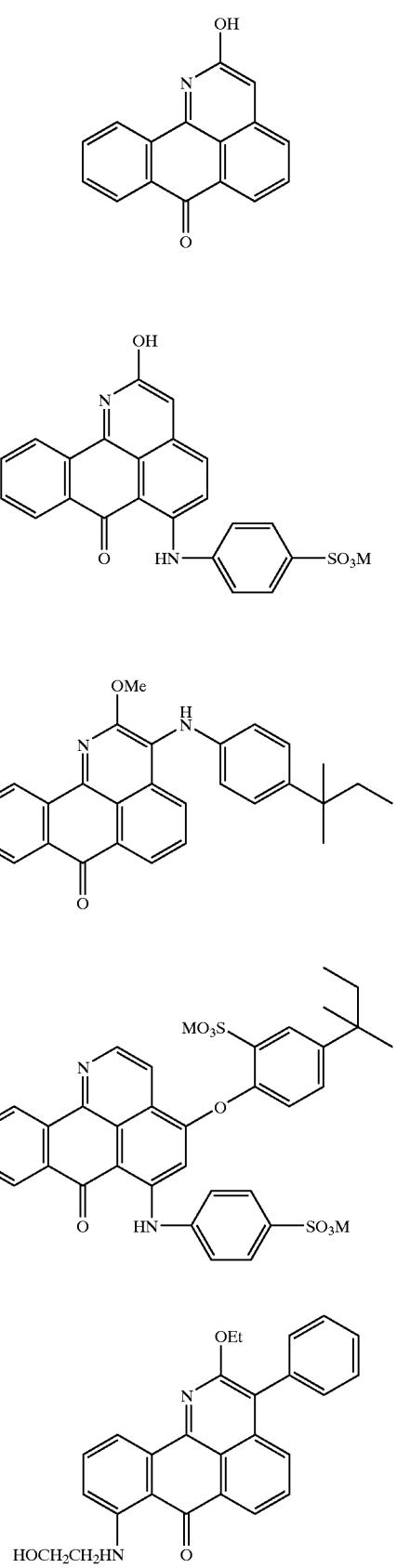
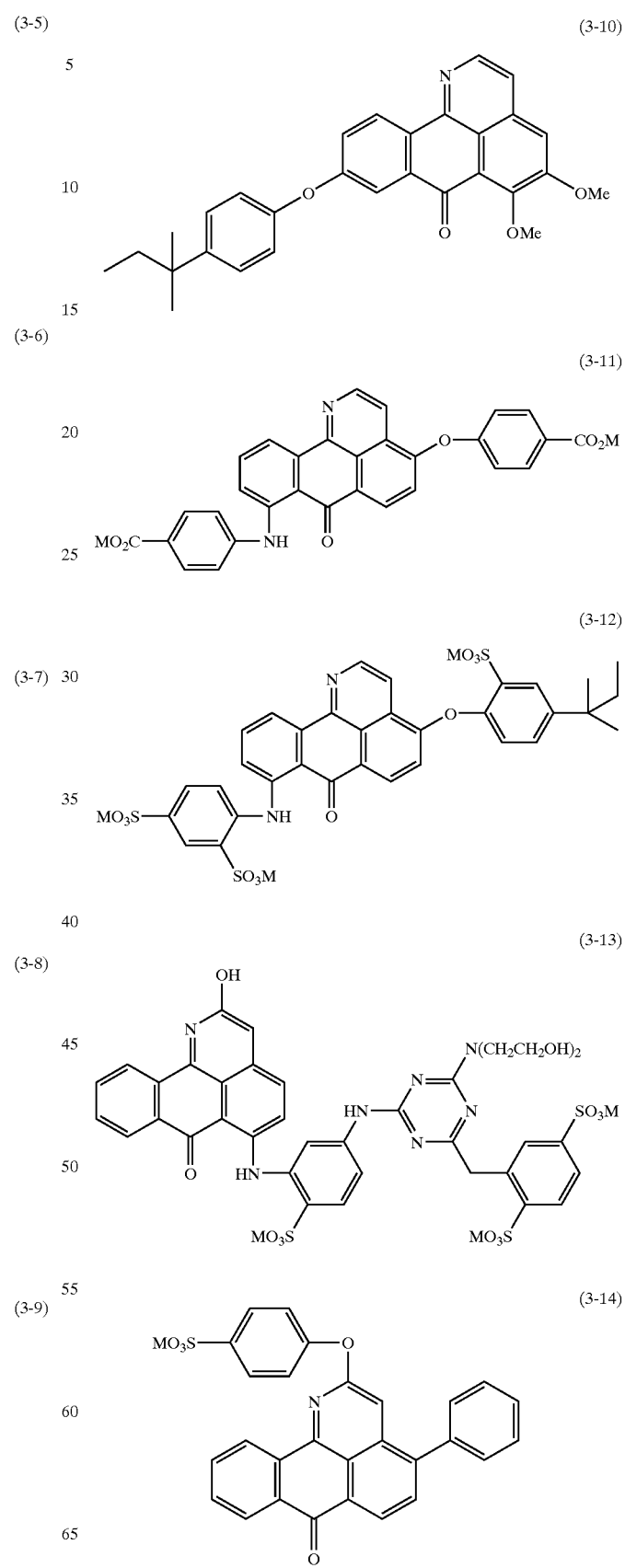

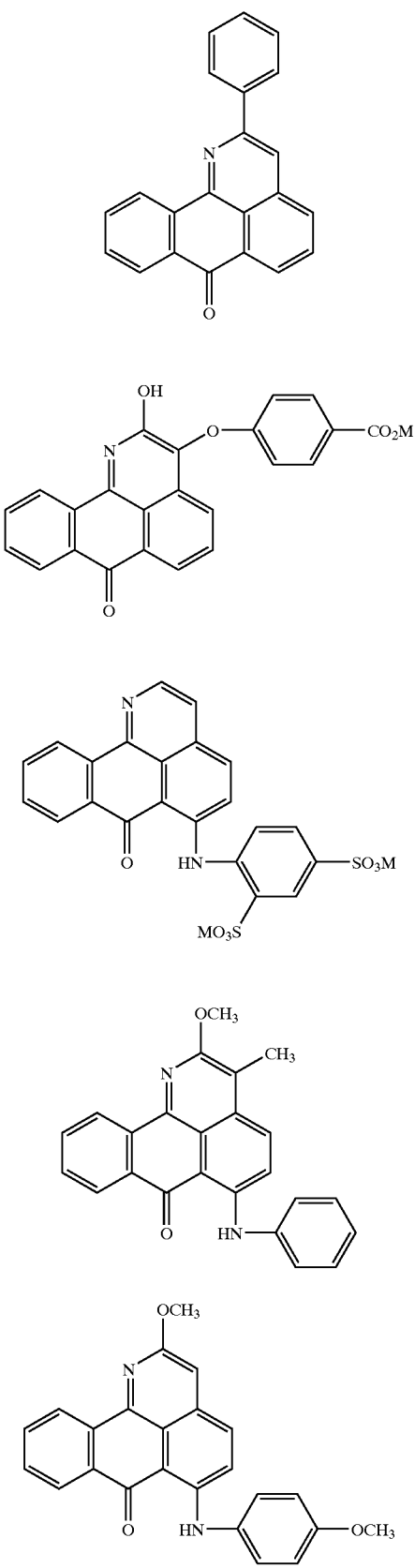

-continued (3-26)

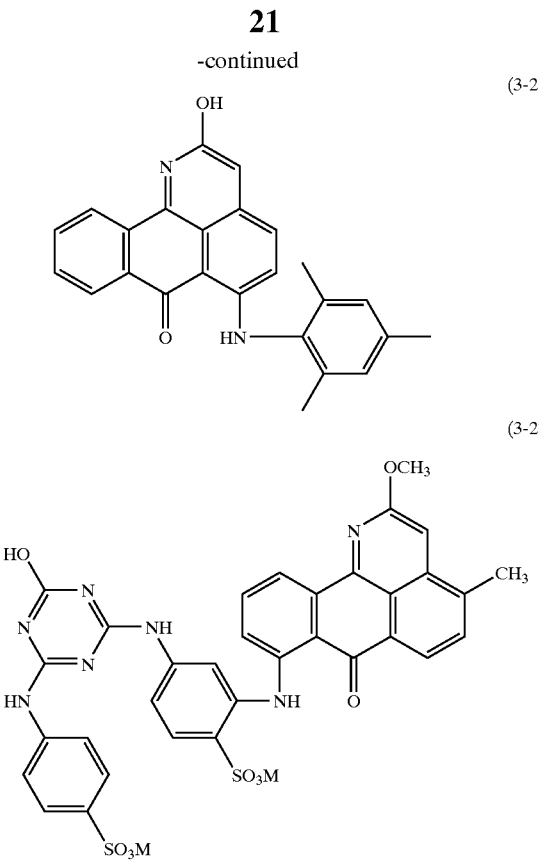

(3-27)

Hereinafter, synthetic examples of the compound represented by Formula (1), (2) or (3) of the present invention will be shown.

SYNTHETIC EXAMPLES i) Synthesis of Exemplified Compound 1-2

The exemplified compound 1-2 was synthesized in accordance with the following scheme (1).

SYNTHESIS SCHEME (1)

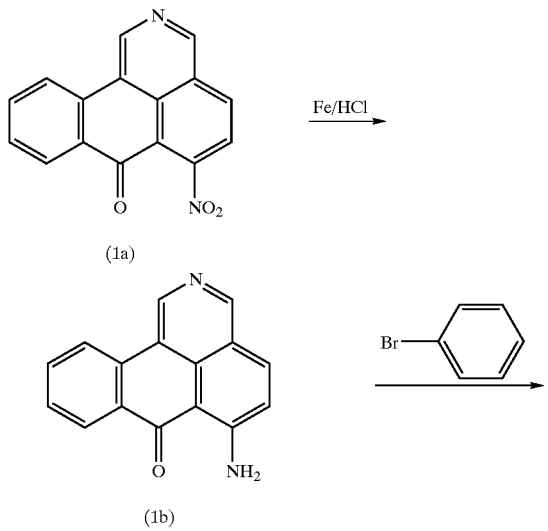

-continued

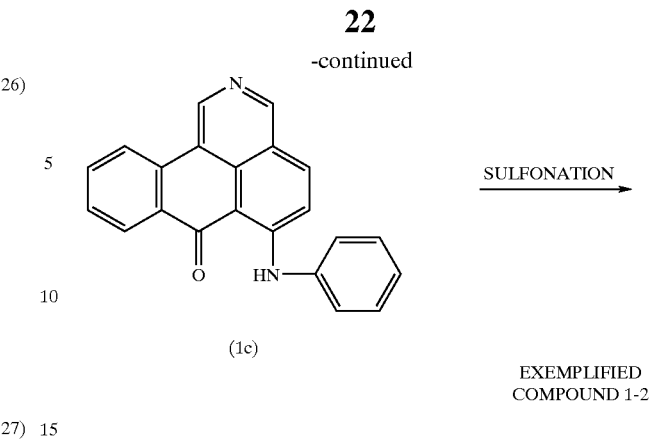

EXEMPLIFIED COMPOUND 1-2

(Synthesis of Intermediate 1b)

In 150 ml of acetic acid, 27.6 g (0.1 mol) of (1a) (synthesized from o-nitrobenzoic acid in accordance with a method disclosed in Synthesis, 2, 262–266 (2001), total yield of 48%) was dissolved. After 25.4 g (0.46 mol) of iron was added in the dissolved material, they were reacted at 75° C. for 4 hours. After the reaction was completed, they were filtrated and the filtrate was extracted by toluene/water. Then, an intermediate (1b) was obtained by distillating the solvent.

(Synthesis of Intermediate 1c)

In 300 ml of nitrobenzene, (1b) obtained by the above-described reaction, 15.7 g (0.1 mol) of bromobenzene, 24.6 g (0.3 mol) of sodium acetate and 3.4 g of cuprous chloride were heated at approximately 200° C. and reacted for 14 hours. After the reaction was completed, they were cooled and the deposited crystal was filtrated. Then, the crystal was washed with nitrobenzene, dilute hydrochloric acid and ethanol, and 21.3 g (yield of 66%) of (1c) was obtained.

(Synthesis of Exemplified Compound 1-2)

Under iced condition, 6.4 g (0.02 mol) of the intermediate (1c) was added to 120 g of concentrated sulfonic acid, and sulfonation was carried out at under 10° C. for one hour. After the reaction was completed, the reaction liquid was added to 400 g of ice, and the obtained crystal was filtrated. The crystal was added to 5% salt solution to which a small amount of sodium hydroxide is added, and stirred for 30 minutes. Then, 8.1 g (yield of 78%) of sodium salt of the exemplified compound 1-2 was obtained by filtrating the crystal.

It was confirmed that the obtained compound is the objective exemplified compound 1-2 according to $^1$H-NMR spectrum.

ii) Synthesis of Exemplified Compound 2-16

The exemplified compound 2-16 was synthesized in accordance with the following scheme (2).

SYNTHESIS SCHEME (2)

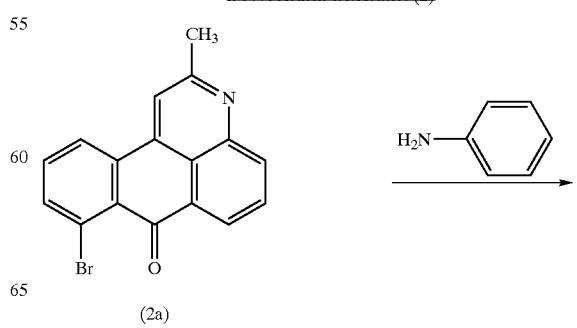

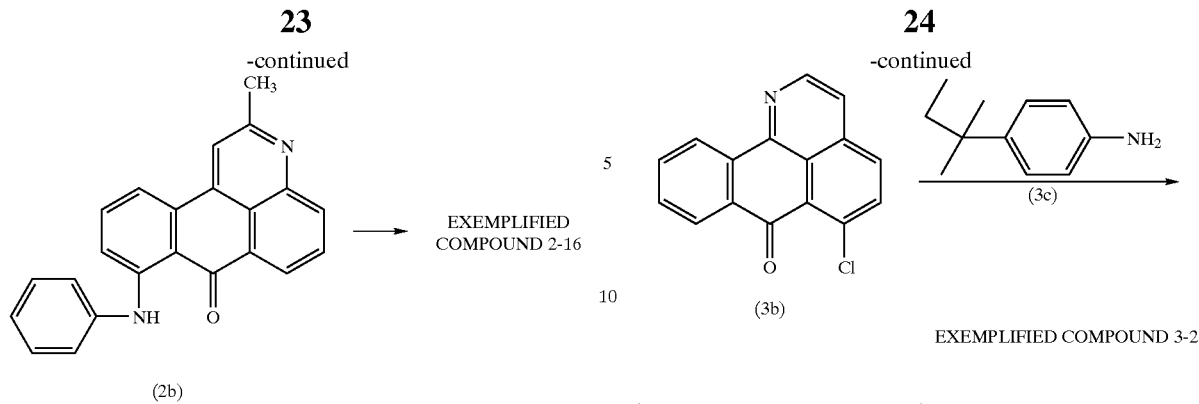

EXEMPLIFIED COMPOUND 2-16

EXEMPLIFIED COMPOUND 3-2

(Synthesis of Intermediate 2b)

In 150 ml of N,N-dimethylformamide, 32.4 g (0.1 mol) of (2a) (synthesized from 1-amino-5-bromoanthraquinone in accordance with the method disclosed in J. Med. Chem., 44, 12, 2004–2014 (2001), the total yield of 92%) was dissolved. Then, 27.6 g (0.2 mol) of potassium carbonate, 10.2 g (0.11 mol) of aniline and 1.0 g (0.01 mol) of copper chloride (I) were added in the dissolved material, and they were reacted at approximately 110° C. for 2 hours. After the reaction was completed, water was added to 350 ml of the reaction liquid, and the deposited crystal was filtrated. Then, the coarse crystal was further recrystallized by acetonitrile, and thereby, 27.2 g (yield of 81%) of the intermediate (2b) was obtained.

(Synthesis of Exemplified Compound 2-16)

Under iced condition, 6.7 g (0.02 mol) of the intermediate (2b) was added to 56 g of 10% fuming sulfuric acid at under 20° C., and sulfonation was carried out at approximately 50° C. for 5 hours. After the reaction was completed, the reaction liquid was added to 400 ml of ice water. Then, 30 g of sodium chloride was further added and salting out was carried out. Then, 6.3 g (yield of 59%) of sodium salt of the exemplified compound 2-16 was obtained by filtration and drying.

It was confirmed that the obtained compound is the objective exemplified compound 2-16 according to $^1$H-NMR spectrum.

iii) Synthesis of Exemplified Compound 3-2

The exemplified compound 3-2 was synthesized in accordance with the following scheme (3).

SYNTHESIS SCHEME (3)

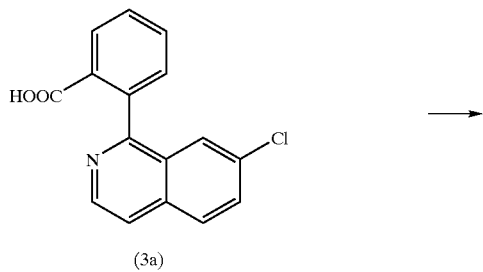

(3a)

(Synthesis of Intermediate 3b)

In 300 g of chlorosulfonic acid, 28.4 g (0.1 mol) of (3a) was added and stirred at room temperature for 2 hours. After the reaction was completed, the reaction liquid was put into 3 l of water, and sodium hydroxide aqueous solution was added until the solution became neutrality. Then, the deposited crystal was filtrated, and 19.1 g (yield of 72%) of an intermediate (3b) was obtained by recrystallizing from butanol.

(Synthesis of Exemplified Compound 3-2)

In 70 ml of N,N-dimethylformamide, 13.3 g (0.05 mol) of the intermediate (3b) was dissolved. Then, 13.8 g (0.1 mol) of potassium carbonate, 9.0 g (0.055 mol) of (3c) and 0.5 g (0.005 mol) of copper chloride (I) were added in the dissolved material, and they were reacted at approximately 110° C. for 2 hours. Thereafter, 8.26 g (0.055 mol) of p-tert-amylaniline was further added, and they were reacted at the same temperature for 3 hours. After the reaction was completed, water was added to 150 ml of the reaction liquid, and the deposited crystal was filtrated. Then, the coarse crystal was further recrystallized by toluene, and thereby, 30.2 g (yield of 77%) of the exemplified compound 3-2 was obtained.

It was confirmed that the obtained compound is the objective exemplified compound 3-2 according to $^1$H-NMR spectrum.

As for the ink jet recording liquid containing the dye of the present invention, only one kind of dye of the present invention may be used, or more than two kinds of dyes may be used together, or a dye different from that of the present invention may be also used together.

As solvent of the ink jet recording liquid containing the dye of the present invention, various kinds of solvent such as water-based solvent, oil-based solvent, solid (phase change) solvent and the like can be used. In particular, the aqueous solvent is preferable in the present invention.

The water-based solvent employs a mixture of water (preferably, for example, ion-exchanged water) and water-soluble organic solvent.

The water-soluble organic solvent includes alcohols (for example, methanol, ethanol, propanol, isopropanol, butanol, isobutanol, secondary butanol, tertiary butanol, pentanol, hexanol, cyclohexanol, benzylalcohol and the like), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol and the like), polyhydric alcohol ethers (for example, ethyleneglycol monomethylether, ethyleneglycol monoethylether, ethyleneglycol monobutylether, diethyleneglycol monomethylether, diethyleneglycol monoethylether, diethyleneglycol monobutylether, propylenegrlcol monomethylether, propyleneglycol monobutylether, ethyleneglycol monomethylether acetate, triethyleneglycol monomethylether, triethyleneglycol monoethylether, ethyleneglycol monophenylether, propyleneglycol monophenylether and the like), amines (for example, ethanol amine, diethanol amine, triethanol amine, N-methyldiethanol amine, N-ethyldiethanol amine, morpholine, N-ethylmorpholine, ethylenediamine, diethylenediamine, triethylenetetramine, tetraethylenepentamine, polyethyleneimine, pentamethyldiethylenetriamine, tetramethylpropylenediamine and the like), amides (for example, formamide, N,N-dimethylformamide, N,N-dimethylacetoamide and the like), heterocyclic compounds (for example, 2-pyrrolidone, N-methyl-2-pyrrolidone, cyclohexylpyrrolidone, 2-oxazolidone, 1,3-dimethyl-2-imidazolidinon and the like), sulfoxides (for example, dimethylsulfoxide and the like), sulfones (for example, sulfolane and the like), urea, acetonitrile, acetone and the like.

If the dye of the present invention is soluble in aforesaid solvent, the above-described water-based solvent can be used by dissolving the dye as it is. In this case, the solubility of the dye of the present invention to the water-based solvent becomes important. It is preferable that the compound of the present invention comprises at least one or more of a sulfonate group or a carboxyl group, and more preferably, at least two or more of the sulfonate group or the carboxyl group.

On the other hand, when the dye of the present invention is a solid, which is insoluble in aforesaid solvent as it is, the dye may be dispersed in the solvent, in which the dye is insoluble as it is, with a polymer dispersant or a surfactant after being reduced to fine particles by using various dispersers (for example, a ball mill, a sand mill, an attriter, a roll mill, an agitator mill, a Henshell mixer, a colloid mill, an ultrasonic homogenizer, a pearl mill, a jet mill, an Ang mill and the like) or dissolving the dye in soluble organic solvent. Moreover, when the dye is liquid or semi-diffused material, which is insoluble in aforesaid solvent as it is, the dye may be dispersed in the solvent with a polymer dispersant or a surfactant as it is or after being dissolved in soluble organic solvent.

When the dye of the present invention is insoluble in aforesaid solvent, it is preferable to disperse the dye by reducing it to fine particles. It is more preferable to disperse in fine particles not more than 150 nm.

Further, the dye of the present invention is preferable to be dispersed in the water-based solvent with an oil-soluble polymer as a fine particle dispersion material after being dissolved in soluble organic solvent.

With regard to practical preparation method of water-based solvent used in the above-mentioned ink jet recording liquid, for example, the methods disclosed in the Japanese Patent Laid-Open Publications Nos. 5-148436, 5-295312, 7-97541, 7-82515, 7-118584 and the like can be referred.

Next, the oil-soluble polymer according to the present invention will be explained.

As for oil-soluble polymer, it is not particularly limited, and it can be selected appropriately for any purpose. However, a vinyl polymer is preferable. The vinyl polymer includes the well-known ones in earlier technology. It may be any of water-insoluble type, water dispersion (self emulsification) type and water-soluble type. However, the water dispersion type vinyl polymer is preferable in view of production easiness of colored fine particles, dispersion stability and the like.

The water dispersion type vinyl polymer may be any one of ionic dissociation type, nonionic dispersive group containing type, and mixed type of these. The ionic dissociation type vinyl polymer includes a vinyl polymer containing a cationic dissociative group, such as tertiary amino group, or a vinyl polymer containing an anionic dissociative group, such as carboxylic acid, sulfonic acid or the like. The nonionic dispersive group containing type vinyl polymer includes a vinyl polymer containing a nonionic dispersive group, such as polyethyleneoxy chain or the like. Among these, the ionic dissociation type vinyl polymer containing an anionic dissociative group, nonionic dispersive group containing type vinyl polymer, and the mixed type vinyl polymer are preferable.

As monomers for forming the above-described vinyl polymers, for example, the following ones can be given.

That is, acrylic esters, concretely, methylacrylate, ethylacrylate, n-propylacrylate, isopropylacrylate, n-butylacrylate, isobutylacrylate, sec-butylacrylate, tert-butylacrylate, amylacrylate, hexylacrylate, 2-ethylhexylacrylate, octylacrylate, tert-octylacrylate, 2-chloroethylacrylate, 2-bromoethylacrylate, 4-chlorobutylacrylate, cyanoethylacrylate, 2-acetoxyethylacrylate, benzylacrylate, methoxybenzylacrylate, 2-chlorocyclohexylacrylate, cyclohexylacrylate, furfurylacrylate, tetrahydrofurfurylacrylate, phenylacrylate, 5-hydroxypentylacrylate, 2,2-dimethyl-3-hydroxypropylacrylate, 2-methoxyethylacrylate, 3-methoxybutylacrylate, 2-ethoxyethylacrylate, 2-butoxyethylacrylate, 2-(2-methoxyethoxy)ethylacrylate, 2-(2-butoxyethoxy)ethylacrylate, glycidylacrylate, 1-bromo-2-methoxyethylacrylate, 1,1-dichloro-2-ethoxyethylacrylate, 2,2,2-tetrafluoroethylacrylate, 1H,1H, 2H,2H-perfluorodecylacrylate and the like;

Metacrylic esters, concretely, methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, hexyl methacrylate, cyclohexyl methacrylate, benzyl methacrylate, chlorobenzyl methacrylate, octyl methacrylate, stearyl methacrylate, 2-(3-phenylpropyloxy) ethyl methacrylate, furfuryl methacrylate, tetrahydrofurfuryl methacrylate, phenyl methacrylate, cresyl methacrylate, naphthyl methacrylate, 2-hydroxyethyl methacrylate, 4-hydroxybutyl methacrylate, triethylene glycol monomethacrylate, dipropylene glycol monomethacrylate, 2-methoxyethyl methacrylate, 3-methoxybutyl methacrylate, 2-ethoxyethyl methacrylate, 2-isopropoxyethyl methacrylate, 2-butoxyethyl methacrylate, 2-(2-methoxyethoxy)ethyl methacrylate, 2-(2-ethoxyethoxy)ethyl methacrylate, 2-(2-butoxyethoxy)ethyl methacrylate, 2-acetoxyethyl methacrylate, 2-acetoacetoxymethyl methacrylate, aryl methacrylate, glycidyl methacrylate, 2,2,2-tetrafluoroethyl methacrylate, 1H,1H,2H,2H-perfluorodecyl methacrylate and the like;

Vinyl esters, concretely, vinyl acetate, vinyl propionate, vinyl butylate, vinyl isobutylate, vinyl caproate, vinyl chloroacetate, vinyl methoxyacetate, vinyl phenylacetate, vinyl benzoate, vinyl salicylate and the like;

Acrylamides, concretely, acrylamide, methylacrylamide, ethylacrylamide, propylacrylamide, butylacrylamide, tert-butylacrylamide, tert-octylacrylamide, cyclohexylacrylamide, benzylacrylamide, hydroxymethylacrylamide, methoxymethylacrylamide, butoxymethylacrylamide, methoxyethylacrylamide, phenylacrylamide, dimethylacrylamide, diethylacrylamide, β-cyanoethylacrylamide, N-(2-acetoacetoxyethyl)acrylamide, diacetoneacrylamide and the like;

Methacrylamides, concretely, methacrylamide, methyl methacrylamide, ethyl methacrylamide, propyl methacrylamide, butyl methacrylamide, tert-butyl methacrylamide, cyclohexyl methacrylamide, benzyl methacrylamide, hydroxymethyl methacrylamide, methoxyethyl methacrylamide, phenyl methacrylamide, dimethyl methacrylamide, β-cyanoethyl methacrylamide, N-(2-acetoacetoxyethyl) methacrylamide and the like;

Olefins, concretely, dicyclopentadiene, ethylene, propylene, 1-butene, 1-pentene, vinyl chloride, vinylidene chloride, isoprene, chloroprene, butadiene, 2,3-dimethylbutadiene and the like, stylenes, for example, stylene, methylstylene, dimethylstylene, trimethylstylene, ethylstylene, isopropylstylene, chloromethylstylene, methoxystylene, acetoxystylene, chlorostylene, dichlorostylene, bromostylene, vinyl methyl benzoate ester and the like;

Vinyl ethers, concretely, methyl vinyl ether, butyl vinyl ether, hexyl vinyl ether, methoxyethyl vinyl ether and the like; and Other monomers including butyl crotonate, hexyl crotonate, dimethyl itaconate, dibutyl itaconate, diethyl maleate, dimethyl maleate, dibutyl maleate, diethyl fumarate, dimethyl fumarate, dibutyl fumarate, methyl vinyl ketone, phenyl vinyl ketone, methoxyethyl vinyl ketone, N-vinyloxazolidone, N-vinylpyrrolidone, vinylidene chloride, methylene malononitrile, vinylidene, diphenyl-2-acryloyloxyethylphosphate, diphenyl-2-methacryloyloxyethylphosphate, dibutyl-2-acryloyloxyethylphosphate, dioctyl-2-methachloyloxyethylphosphate and the like.

Further, the monomer having a dissociative group includes a monomer having an anionic dissociative group and a monomer having a cationic dissociative group.

The anionic dissociative group includes, for example, carboxylic monomer, sulfonic monomer, phosphoric monomer and the like.

The carboxylic monomer includes, for example, acrylic acid, methacrylic acid, itaconic acid, maleic acid, fumaric acid, citraconic acid, crotonic acid, esters of monoalkyl itaconate (for example, monomethyl itaconate, monoethyl itaconate, monobutyl itaconate and the like), esters of monoalkyl maleate (for example, monomethyl maleate, monoethyl maleate, monobutyl maleate and the like) and the like.

The sulfonic monomer includes, for example, stylenesulfonic acid, vinyl sulfonic acid, acryloyloxyalkylsulfonic acid (for example, acryloyloxymethylsulfonic acid, acryloyloxyethylsulfonic acid, acryloyloxypropylsulfonic acid and the like), methacryloyloxyalkylsulfonic acid (for example, methacryloyloxymethylsulfonic acid, methacryloyloxyethyls ulfonic acid, methacryloyloxypropylsulfonic acid and the like), acrylamidealkylsulfonic acid (for example, 2-acrylamide-2-ethylethanesulfonic acid, 2-acrylamide-2-methylpropanesulfonic acid, 2-acrylamide-2-methylbutanesulfonic acid and the like), methacrylamidealkylsulfonic acid (for example, 2-methacrylamide-2-methylethanesulfonic acid, 2-methacrylamide-2-methylpropanesulfonic acid, 2-methacrylamide-2-methylbutanesulfonic acid and the like) and the like.

The phosphoric monomer includes, for example, vinylphosphonate, methacryloyloxyethylphosphonate and the like.

Among these, acrylic acid, methacrylic acid, stylenesulfonic acid, vinyl sulfonic acid, acrylamidealkylsulfonic acid and mathecrylamidealkylsulfonic acid are preferable, and acrylic acid, methacrylic acid, stylenesulfonic acid, 2-acrylamide-2-methylpropanesulfonic acid and 2-acrylamide-2-methylbutanesulfonic acid are more preferable.

The monomer having a cationic dissociative group includes, for example, monomers having tertiary amino groups, such as dialkylaminomethyl methacrylate, dialkylaminoethylacrylate and the like.

Further, the monomer containing a nonionic dispersive group includes, for example, ester of polyethyleneglycol monoalkylether with carboxylic monomer, ester of polyethyleneglycol monoalkylether with sulfonic monomer, ester of polyethyleneglycol monoalkylether with phopheric acid, urethane containing vinyl group formed by polyethyleneglycol monoalkylether and monomer containing isocyanate group, macromonomer containing polyvinyl alcohol structure, and the like. The repeated number of the ethyleneoxy part of the polyethyleneglycol monoalkylether is preferable to be between 8 and 50, and more preferably, between 10 and 30. The number of carbon atom of the polyethyleneglycol monoalkylether is preferable to be between 1 and 20, and more preferably, between 1 and 12.

One kind of these monomers may be used independently to form a vinyl polymer, or two or more kinds of these may be used together to form a vinyl polymer. It can be selected for any purpose of the vinyl polymer (such as, Tg adjustment, solubility improvement, stability of dispersion material or the like).

As oil-based solvent used in the present invention, organic solvent is used.

The oil-based solvent includes, for example, in addition to the water-soluble organic solvent in the above-described water-based solvent, alcohols (for example, pentanol, heptanol, octanol, phenylethyl alcohol, phenylpropyl alcohol, furfuryl alcohol, anyl alcohol and the like), esters (for example, ethyleneglycol diacetate, ethyleneglycol monomethyletheracetate, diethyleneglycol monomethyletheracetate, propyleneglycol diacetate, ethyl acetate, amyl acetate, benzyl acetate, phenylethyl acetate, phenoxyethyl acetate, ethyl phenylacetate, benzyl propionate, ethyl benzoate, butyl benzoate, butyl laurate, isopropyl mystyrate, triethyl phosphate, tributyl phosphate, diethyl phthalate, dibutyl phthalate, diethyl malonate, dipropyl malonate, diethyl diethylmalonate, diethyl succinate, dibutyl succinate, diethyl glutarate, diethyl adipate, dipropyl adipate, dibutyl adipate, di(2-methoxyethyl) adipate, diethyl sebacate, diethyl maleate, dibutyl maleate, dioctyl maleate, diethyl fumarate, dioctyl fumarate, 3-hexenyl cinnamate and the like), ethers (for example, butyl phenyl ether, benzyl ethyl ether, hexyl ether and the like), ketones (for example, benzyl methyl ketone, benzyl acetone, diacetone alcohol, cyclohexanone and the like), hydrocarbons (for example, petroleum ether, petroleum benzine, tetralin, decalin, tertiary amyl benzene, dimethyl naphthalin and the like), and amides (for example, N,N-diethyldodecanamide and the like).

The dyes used in the present invention can be dissolved in the above-described oil-based solvent, or dispersed or dissolved in the above-described oil-based solvent in admixture with a resin-like dispersant or binder.

The above oil-based solvent used in such an ink jet recording liquid can be prepared according to the methods disclosed in the Japanese Patent Laid-Open Publication No. 3-231975 and the International Patent Publication No. 5-508883.

The solvent used in the present invention may be solid at room temperature, which is capable of changing its phase to be in a liquid form when the ink jet recording liquid is heat jetted during recording.

The phase changing solvent includes natural wax (for example, bees wax, carnauba wax, rice wax, Japan wax, hohoba-oil, spermaceti, candelilla wax, lanolin, montan wax, ozocerite, ceresin, paraffin wax, microcrystalline wax, petrolactam and the like), polyethylene wax derivatives, halogenated hydrocarbons, organic acids (for example, palmitic acid, stearic acid, behenic acid, tiglic acid, 2-acetonaphthonebehenic acid, 12-hydroxystearic acid, dihydroxystearic acid and the like), esters of organic acids (for example, esters of the above-described organic acids with alcohols such as grycerin, diethylene glycol, ethylene glycol and the like, and the like), alcohols (for example, dodecanol, tetradecanol, hexadecanol, eicosanol, docosanol, tetracosanol, hexacosanol, octacosanol, dodecenol, myricyl alcohol, tetradecenol, hexadecenol, eicosenol, docosenol, pinene glycol, hinokiol, butyne diol, nonane diol, isophthalyl alcohol, mesicerin, terephthalyl alcohol, hexane diol, decane diol, dodecane diol, tetradecane diol, hexadecane diol, docosane diol, tetracosane diol, terpineol, phenyl glycerin, eicosane diol, octane diol, phenyl propylene glycol, bisphenol A, p-α-cumylphenol and the like), ketones (for example, benzoylacetone, diacetobenzene, benzophenone, tricosanone, heptacosanone, heptatriacontanone, hentriacontanone, heptatriacontanone, stearone, laurone, dianisole and the like), amides (for example, oleic amide, lauric amide, stearic amide, licinolic amide, palmitic amide, tetrahydrofuroic amide, erucic amide, myristic amide, 12-hydroxystearic amide, N-stearylerucic amide, N-oleylstearic amide, N,N'-ethylenebislauric amide, N,N'-ethylenebisstearic amide, N,N'-ethylenebisoleic amide, N,N'-methylenebisstearic amide, N,N'-ethylenebisbehenic amide, N,N'-xylylenebisstearic amide, N,N'-butylenebisstearic amide, N,N'-dioleyladipic amide, N,N'-distearyladipic amide, N,N'-dioleylsebacic amide, N,N'-distearylsebacic amide, N,N'-distearylterephthalic amide, N,N'-distearylisophthalic amide, phenacetin, toluamide, acetoamide, a reaction product tetramide of dimeric acid, diamine and fatty acid such as an oleic acid dimmer/ethylenediamine/stearic acid (1:2:2 molratio) and the like), sulfonamides (for example, p-toluene sulfonamide, ethylbenzene sulfonamide, butylbenzene sulfonamide and the like), silicones (for example, Silicone SH6018 produced by Toray Silicone Co., Ltd., Silicone KR215, 216, 220 produced by Shinetsu Silicone Co., Ltd., and the like), cumarones (for example, Eskron G-90 produced by Shinnittetsu Kagaku Co., Ltd., and the like), cholesterol fatty acid esters (for example, stearic acid cholesterol ester, palmitic acid cholesterol ester, myristic acid cholesterol ester, behenic acid cholesterol ester, lauric acid cholesterol ester, melissic acid cholesterol ester and the like), and saccharide fatty acid esters (for example, stearic acid saccharose ester, palmitic acid saccharose ester, behenic acid saccharose ester, lauric acid saccharose ester, melissic acid saccharose ester, stearic acid lactose ester, palmitic acid lactose ester, myristic acid lactose ester, behenic acid lactose ester, lauric acid lactose ester, melissic acid lactose ester and the like).

Phase change temperature of solid (phase change) solvent in solid-liquid phase change is preferably between 60° C. and 200° C., and more preferably, between 80° C. and 150° C.

The above-described solid (phase change) solvent may be used after dissolving the dye of the present invention in heated and fused solvent, or it may also be used after dispersing or dissolving in a resin-like dispersant or a binder.

With regard to a practical preparation method of aforesaid phase change solvent, the methods disclosed in the Japanese Patent Laid-Open Publications Nos. 5-186723 and 7-70490 can be referred.

The viscosity of the ink jet recording liquid of the present invention, wherein water-based solvent, oil-based solvent or solid (phase change) solvent is used and the dye of the present invention is dissolved, at the time of ejection, is preferably not more than $40 \times 10^{-3}$ Pa·s, and more preferably, not more than $30 \times 10^{-3}$ Pa·s.

Further, the surface tension of the above-described ink jet recording liquid of the present invention at the time of ejection is preferably between $20 \times 10^{-5}$ and $100 \times 10^{-5}$ N/cm, and more preferably, between $30 \times 10^{-5}$ and $80 \times 10^{-5}$ N/cm.

The dye content in the ink jet recording liquid of the present invention is preferably between 0.1 mass % and 25 mass %, and more preferably, between 0.5 mass % and 10 mass %.

As a resin-like dispersant used in the present invention, polymers having molecular weight of 1,000 to 1,000,000 are preferable. When these are used, it is preferable to be contained in the ink jet recording liquid at between 0.1 mass % and 50 mass %.

To the ink jet recording liquid of the present invention, depending upon the purposes of improving ejecting stability, compatibility to a print head or ink cartridge, storage stability, image stability and other performances, a viscosity regulator, a surface tension regulator, a specific resistance regulator, a layer former, a dispersant, a surfactant, a UV absorber, an anti-oxidant, an anti-color fading agent, an anti-mildew agent, an anti-rust agent and the like can be added.

There is no specific limit to ink jet recording systems regarding the ink jet recording liquid of the present invention. However, particularly, the ink jet recording liquid of the present invention can be used preferably as an ink jet recording liquid for an on-demand type ink jet printer. As the on-demand type, electro-mechanical conversion types (for example, a single cavity type, a double cavity type, a vendor type, a piston type, a shear mode type, a sheared-wall type and the like), electric-heat conversion types (for example, a thermal ink jet type and a bubble jet (R) type and the like), electrostatic absorption types (for example, an electric field control type, a slit jet type and the like), discharge systems (for example, a spark jet type and the like) and the like can be cited as practical.

EXAMPLES

Hereinafter, the present invention will be explained in detail with reference to examples. However, the embodiment of the present invention is not limited thereto.

Example 1

(Preparation of Water-Based Ink)

Each dye shown in Table 1 was weighed so that the content of each dye would become 2 mass % to the finished amount of ink. Then, 15% of ethylene glycol, 15% of glycerin, 0.3% of Surfynol 465 (produced by Nissin Chemical Industry Co., Ltd.), and pure water in the rest were added and mixed in the weighed dye. Further, the mixed material was filtrated with a 2 μm membrane filter, and foreign particles and coarse particles were removed to obtain ink for ink jet No. 1 to 12 as shown in Table 1.

(Preparation and Evaluation of Image Sample)

Further, each ink was printed on a Konica photo jet paper Photolike QP coated paper (produced by Konica Co., Ltd.) by a commercially produced ink jet printer (PM-800) produced by Epson. Then, the light fastness, color tone and storage stability of the image of the obtained image sample were evaluated. The results are also shown in Table 1.

Light Fastness of Ink:

The reflection spectrum density at visible maximum absorption wavelength of an unexposed sample (density at the maximum absorption wavelength before exposure) was measured by a Xenon Fadometer. Further, the unexposed sample was exposed for 24 hours, and the reflection spectrum density at visible maximum absorption wavelength of the sample after exposure (density at the maximum absorption wavelength after exposure) was also measured. Then, the light fastness was calculated by the following equation as decreasing rate of the reflection spectrum density at visible maximum absorption wavelength to the unexposed image sample after being exposed for 24 hours.

Light Fastness (%)=(density at the maximum absorption wavelength after exposure/density at the maximum absorption wavelength before exposure)×100

Color Tone of Image of Ink:

The reflection spectra of the image samples according to 10 nm interval in the region of 390 to 730 nm were measured, and a* and b* were calculated on the basis of CIE. L*a*b* color space system.

The color tone preferable as magenta was defined as follows and evaluated according to the following three-level evaluation standards.

Preferable range of a*: 76 or more

Preferable range of b*: −30 to 0

○: Both a* and b* were within preferable range

Δ: Only one of a* and b* was within preferable range

X: Both a* and b* were outside of preferable range

Storage Stability of Ink:

The ink compositions prepared above were stored in a sealed glass container at 80° C. for one week. Thereafter, images were recorded in the same manner as the above-described preparation of the image samples. The presence and absence of jetting faults in continuous jetting for 500 hours were observed. Further, the evaluation of color tone with respect to the prepared images was carried in the same manner as above. The storage stability was evaluated by the following evaluation standards.

○: No jetting faults in continuous jetting was observed and both a* and b*, which show color tone change from non-stored ink, were less than ±10

X: Jetting faults in continuous jetting was observed, or at least one of a* and b*, which show color tone change from non-stored ink, was ±10 or more The results are shown in Table 1.

TABLE 1

| No. | DYE | LIGHT FAST-NESS | COLOR TONE | STORAGE STABILITY | REMARKS |
|---|---|---|---|---|---|
| 1 | COMP. COMPOUND 1 | 53 | ○ | ○ | COMP. |
| 2 | COMP. COMPOUND 2 | 71 | Δ | ○ | COMP. |
| 3 | COMP. COMPOUND 3 | 83 | Δ | ○ | COMP. |
| 4 | EXEMPLIFIED 1-2 | 88 | ○ | ○ | INV. |
| 5 | EXEMPLIFIED 1-5 | 90 | ○ | ○ | INV. |
| 6 | EXEMPLIFIED 1-21 | 91 | ○ | ○ | INV. |
| 7 | EXEMPLIFIED 2-1 | 92 | ○ | ○ | INV. |
| 8 | EXEMPLIFIED 2-22 | 89 | ○ | ○ | INV. |
| 9 | EXEMPLIFIED 2-27 | 90 | ○ | ○ | INV. |

TABLE 1-continued

| No. | DYE | LIGHT FAST-NESS | COLOR TONE | STORAGE STABILITY | REMARKS |
|---|---|---|---|---|---|
| 10 | EXEMPLIFIED 3-1 | 90 | ○ | ○ | INV. |
| 11 | EXEMPLIFIED 3-8 | 92 | ○ | ○ | INV. |
| 12 | EXEMPLIFIED 3-12 | 89 | ○ | ○ | INV. |

COMPARATIVE COMPOUND 1

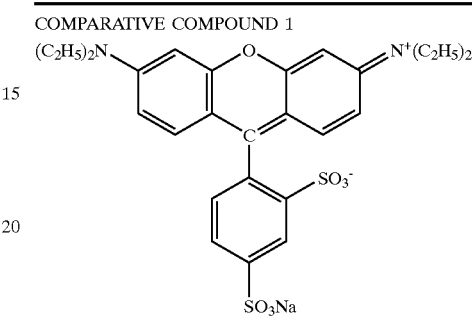

COMPARATIVE COMPOUND 2

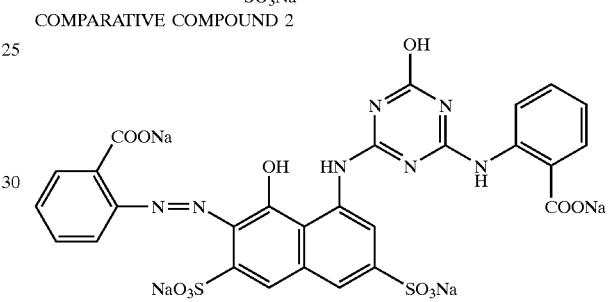

COMPARATIVE COMPOUND 3

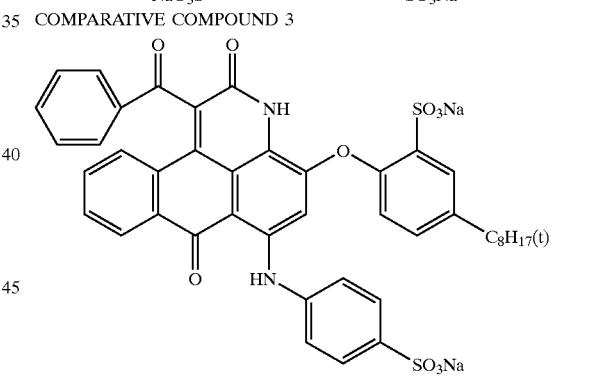

As it is obvious from Table 1, it can be realized that the ink of the present invention is superior to the comparative ink in all terms of light fastness, color tone and storage stability.

Example 2

(Preparation of Fine Particle Dispersion Material)

In mixed liquid of 10 g of each dye shown in Table 2, 20 g of methylethyl ketone, 5 g of glycerin, 6 g of neutralized resin of stylene/acrylic acid/2-hydroxyethyl methacrylate= 80/5/15 and 40 g of ion-exchange water, 250 g of zirconia beads whose mean particle size were 0.5 mm were added. Then, it was dispersed for 4 hours by using a media disperser (System Zeta; produced by Ashizawa Co., Ltd.). After the dispersion was completed, the zirconia beads were filtrated and pigment dispersion liquid was obtained. After 40 ml of water was added to this dispersion liquid to dilute, the methylethyl ketone was removed by vacuum distillation and a fine particle dispersion material of the pigment was obtained.

(Preparation of Water-Based Ink)

The above-described fine particle dispersion material was weighed so that the content of each dye would become 3 mass % to the finished amount of ink. Then, 15 mass % of ethylene glycol, 15 mass % of glycerin, 3 mass % of triethylene glycol monobutylether, 0.3 mass % of Surfynol 465, and pure water in the rest were added in the weighed dye. Then, they were mixed and dispersed. Further, the mixed and dispersed material was filtrated with a 2 μm membrane filter, and foreign particles and coarse particles were removed to obtain ink for ink jet 13 to 17 as shown in Table 2.

(Preparation and Evaluation of Image Sample)

The rate of change in particle size when storing each ink at 60° C. for 7 days, filterability of ink after storage, and moreover, the color tone of image of the image sample printed by using each ink in the same manner as in the Example 1 were evaluated.

Rate of Change in Mean Particle Size of Ink:

The ink compositions prepared above were stored at 60° C. for 7 days, and the mean (volumetric mean) particle size of each ink after storage was calculated by using a laser particle size analysis system produced by Otsuka Electronics Co., Ltd. Then, the mean particle size of non-stored ink was calculated in the same manner, and the rate of change in the mean particle size was calculated by the following equation. The rate of change was also evaluated by the following standards.

Rate of Change in Mean Particle Size (%)={(mean particle size of ink after storage−mean particle size of ink before storage)}/(mean particle size of ink before storage)×100

X: 10% or more (Practical use improper level)

○: 5% to less than 10% (Practical use permission level)

◎: rate of change in particle size of less than 5%

Filterability of Ink:

After each ink was stored at 60° C. for 7 days, 5 ml of the stored ink was obtained and filtrated with 0.8 μm of cellulose acetate membrane filter. The one that the whole ink was able to be filtrated was evaluated by double circle mark (◎), the one that half or more of the ink was able to be filtrated was evaluated by circle mark (○), and the one that only less than half of the ink was able to be filtrated was evaluated by cross mark (X).

Color Tone of Image of Ink:

The color tone was evaluated in the same manner as in the Example 1. The results are shown in Table 2.

TABLE 2

| No. | DYE | COLOR TONE | RATE OF CHANGE IN PARTICLE SIZE | FILTER-ABILITY | RE-MARKS |
|---|---|---|---|---|---|
| 13 | COMP. COMPOUND 4 | Δ | ○ | ○ | COMP. |
| 14 | COMP. COMPOUND 5 | ○ | X | ○ | COMP. |
| 15 | EXEMPLI-FIED 1-9 | ○ | ○ | ◎ | INV. |
| 16 | EXEMPLI-FIED 2-7 | ○ | ○ | ◎ | INV. |
| 17 | EXEMPLI-FIED 3-19 | ○ | ○ | ◎ | INV. |

TABLE 2-continued

| No. | DYE | COLOR TONE | RATE OF CHANGE IN PARTICLE SIZE | FILTER-ABILITY | RE-MARKS |
|---|---|---|---|---|---|

COMPARATIVE COMPOUND 4

COMPARATIVE COMPOUND 5

As it is obvious from Table 2, it can be realized that the ink of the present invention is superior to the comparative ink in terms of rate of change in mean particle size of ink after storage, filterability of ink (that is, storage stability of ink) and color tone of image of ink.

Example 3

(Preparation of Colored Fine Particle Dispersion Material)

In a separable flask, 5 g of each dye shown in Tables 3-1 and 3-2, 5 g of polyvinylbutyral (BL-S produced by Sekisui Chemical Co., Ltd., mean degree of polymerization 350) and 50 g of ethyl acetate were added. After the inside of the flask was substituted by $N_2$ gas, they were stirred and the above-described polymers and each dye were dissolved completely. After 100 g of aqueous solution including 2 g of sodium lauryl sulfate was dropped in the dissolved material, it was emulsified for 300 seconds by using an ultrasonic disperser (UH-150 type, produced by SMT Co., Ltd.). Thereafter, the ethyl acetate was removed under reduced pressure, and dispersion liquid of colored fine particles impregnating the above-described dye was obtained. In this dispersion liquid, 0.15 g of potassium persulfate was added and dissolved, and it was heated to 70° C. by a heater. Thereafter, mixed liquid of 2 g of stylene and 1 g of 2-hydroxyethyl methacrylate was dropped and the liquid was made to react for 7 hours, and finally, a core shell type colored fine particle dispersion material was obtained.

(Preparation of Water-Based Ink)

The above-described colored fine particle dispersion material was weighed so that the content of each dye would become 2 mass % to the finished amount of ink. Then, 15 mass % of ethylene glycol, 15 mass % of glycerin, 3 mass % of triethylene glycol monobutylether, 0.3 mass % of Surfynol 465, and pure water in the rest were added in the weighed dye. Then, they were mixed and dispersed. Further, the mixed and dispersed material was filtrated with a 2 μm membrane filter, and foreign particles and coarse particles were removed to obtain ink for ink jet 18 to 21 as shown in Tables 3-1 and 3-2.

(Preparation and Evaluation of Image Sample)

The rate of change in mean particle size when each ink was stored at 60° C. for 7 days, the filterability of ink after storage were evaluated in the same manner as in the Example 2. Further, the color tone and light fastness of image of the image sample prepared by using each ink were evaluated in the same manner as in the Example 1.

The results are shown in Tables 3-1 and 3-2.

TABLE 3-1

| No. | DYE | COLOR TONE | LIGHT FASTNESS |
| --- | --- | --- | --- |
| 18 | COMP. COMPOUND 5 | ○ | 91 |
| 19 | EXEMPLIFIED 1-25 | ○ | 93 |
| 20 | EXEMPLIFIED 2-15 | ○ | 92 |
| 21 | EXEMPLIFIED 3-9 | ○ | 94 |

TABLE 3-2

| No. | RATE OF CHANGE IN PARTICLE SIZE | FILTERABILITY | REMARKS |
| --- | --- | --- | --- |
| 18 | X | ○ | COMP. |
| 19 | ○ | ⊙ | INV. |
| 20 | ○ | ⊙ | INV. |
| 21 | ○ | ⊙ | INV. |

As it is obvious from Tables 3-1 and 3-2, it can be realized that the ink of the present invention is superior to the comparative ink in terms of rate of change in mean particle size of ink after storage, filterability of ink (that is, storage stability of ink), color tone and light fastness of image of ink.

In the above, the examples of the present invention are explained. However, it is needless to say that the present invention is not limited to such examples, but various modifications are possible in a range within the scope of the present invention.

According to the present invention, ink jet recording liquid, particularly ink jet recording liquid for magenta, giving a color image with excellent light fastness and excellent color tone for color reproduction can be provided. Furthermore, water-based ink jet recording liquid capable of being employed during a long term, giving a color image with excellent light fastness and excellent color tone can also be provided.

The entire disclosure of Japanese Patent Application No. 2002-153904 filed on May 28, 2002 including specification, claims, drawings and summary are incorporated herein by reference in its entirety.

What is claimed is:

1. An ink jet recording liquid comprising a compound represented by the following Formula (1):

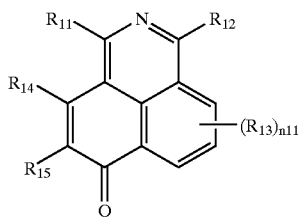

(1)

wherein each of $R_{11}$, $R_{12}$, $R_{13}$, $R_{14}$ and $R_{15}$ in the Formula (1) represents a hydrogen atom or a substituent, and n11 represents an integer number from 1 to 3.

2. An ink jet recording liquid comprising a compound represented by the following Formula (2):

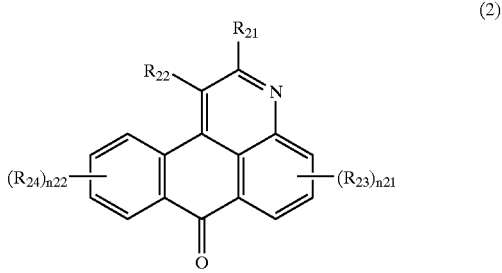

(2)

wherein each of $R_{21}$, $R_{22}$, $R_{23}$ and $R_{24}$ in the Formula (2) represents a hydrogen atom or a substituent, and n21 represents an integer number from 1 to 3 and n22 represents an integer number of 1 or 2.

3. An ink jet recording liquid comprising a compound represented by the following Formula (3):

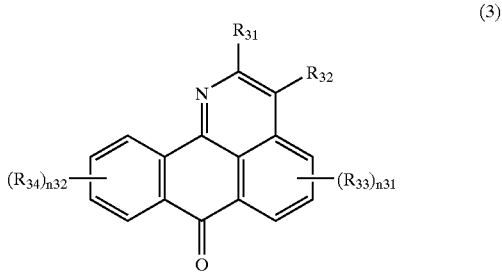

(3)

wherein each of $R_{31}$, $R_{32}$, $R_{33}$ and $R_{34}$ in the Formula (3) represents a hydrogen atom or a substituent, and n31 represents an integer number from 1 to 3 and n32 represents an integer number from 1 to 4.

4. The liquid of claim 1, wherein the compound represented by the Formula (1) comprises a sulfonate group or a carboxyl group.

5. The liquid of claim 1, wherein the compound represented by the Formula (1) is contained as a fine particle dispersion material.

6. The liquid of claim 1, wherein the compound represented by the Formula (1) is contained as a fine particle dispersion material with an oil-soluble polymer.

7. The liquid of claim 2, wherein the compound represented by the Formula (2) comprises a sulfonate group or a carboxyl group.

8. The liquid of claim 2, wherein the compound represented by the Formula (2) is contained as a fine particle dispersion material.

9. The liquid of claim 2, wherein the compound represented by the Formula (2) is contained as a fine particle dispersion material with an oil-soluble polymer.

10. The liquid of claim 3, wherein the compound represented by the Formula (3) comprises a sulfonate group or a carboxyl group.

11. The liquid of claim 3, wherein the compound represented by the Formula (3) is contained as a fine particle dispersion material.

12. The liquid of claim 3, wherein the compound represented by the Formula (3) is contained as a fine particle dispersion material with an oil-soluble polymer.

13. The liquid of claim 1, wherein $R_{14}$ and $R_{15}$ are mutually bonded to form an aromatic ring.

14. The liquid of claim 1, wherein $R_{14}$ and $R_{15}$ are mutually bonded to form a substituted or non-substituted benzene ring.

15. The liquid of claim 1, wherein when n11 is two or more, two $R_{13}$s are mutually bonded to form a ring.

16. The liquid of claim 2, wherein when n21 is two or more and n22 is two, two of $R_{23}$s or $R_{24}$s are mutually bonded to form a ring.

17. The liquid of claim 3, wherein when n31 and n32 are two or more, two $R_{33}$s or $R_{34}$s are mutually bonded to form a ring.

18. The liquid of claim 1, wherein one of water-based solvent, oil-based solvent and solid solvent is used as solvent.

19. The liquid of claim 2, wherein one of water-based solvent, oil-based solvent and solid solvent is used as solvent.

20. The liquid of claim 3, wherein one of water-based solvent, oil-based solvent and solid solvent is used as solvent.

* * * * *